(12) United States Patent
Kodden et al.

(10) Patent No.: US 6,600,875 B2
(45) Date of Patent: Jul. 29, 2003

(54) WATER FLOW HEATER

(75) Inventors: Hans Kodden, Hoogeveen (NL); Thijs De Haan, Drachten (NL); Simon Kaastra, Dinxperlo (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 98 days.

(21) Appl. No.: 09/969,008

(22) Filed: Oct. 2, 2001

(65) Prior Publication Data

US 2002/0051632 A1 May 2, 2002

(30) Foreign Application Priority Data

Oct. 2, 2000 (EP) .............................................. 00203398

(51) Int. Cl.[7] ................................................. F24H 1/08
(52) U.S. Cl. ........................ 392/471; 392/490; 219/490; 99/280
(58) Field of Search .................................. 392/471, 485, 392/490; 99/282, 280, 283, 279; 219/490

(56) References Cited

U.S. PATENT DOCUMENTS 5,375,508 A * 12/1994 Knepler et al. ............... 99/280
5,392,694 A * 2/1995 Muller et al. ................. 99/295
5,440,972 A * 8/1995 English ........................ 99/282
6,000,317 A * 12/1999 Van Der Meer .............. 99/282

FOREIGN PATENT DOCUMENTS

| DE | 2837934 A1 | 3/1980 | |
| DE | 3426046 A1 | 1/1986 | |
| EP | 0630463 B2 | 12/1994 | |
| GB | 2265445 A * | 9/1993 | ............. F24H/1/12 |

* cited by examiner

*Primary Examiner*—Thor Campbell
(74) *Attorney, Agent, or Firm*—Ernestine C. Bartlett

(57) ABSTRACT

Water flow heater with a first heater element (20) for supplying a fixed power, a second, controllable heater element (30), a temperature sensor (40, 50) for measuring the temperature of heated water, and a control unit (22, 32, 80) for controlling the heat supply from the second heater element (30) in dependence on a temperature detected by the temperature sensor (40, 50). A water flowrate lying within a predetermined range is safeguarded in that a pump (60) is provided for generating a water flow through a channel (13), and the control unit is designed so as to activate the heater elements (20, 30) in dependence on activation of the pump (60). As a result, the first heater element (20) of fixed power can have a comparatively high power rating without the risk of water being too strongly heated thereby.

9 Claims, 2 Drawing Sheets

WATER FLOW HEATER

Figure 1:
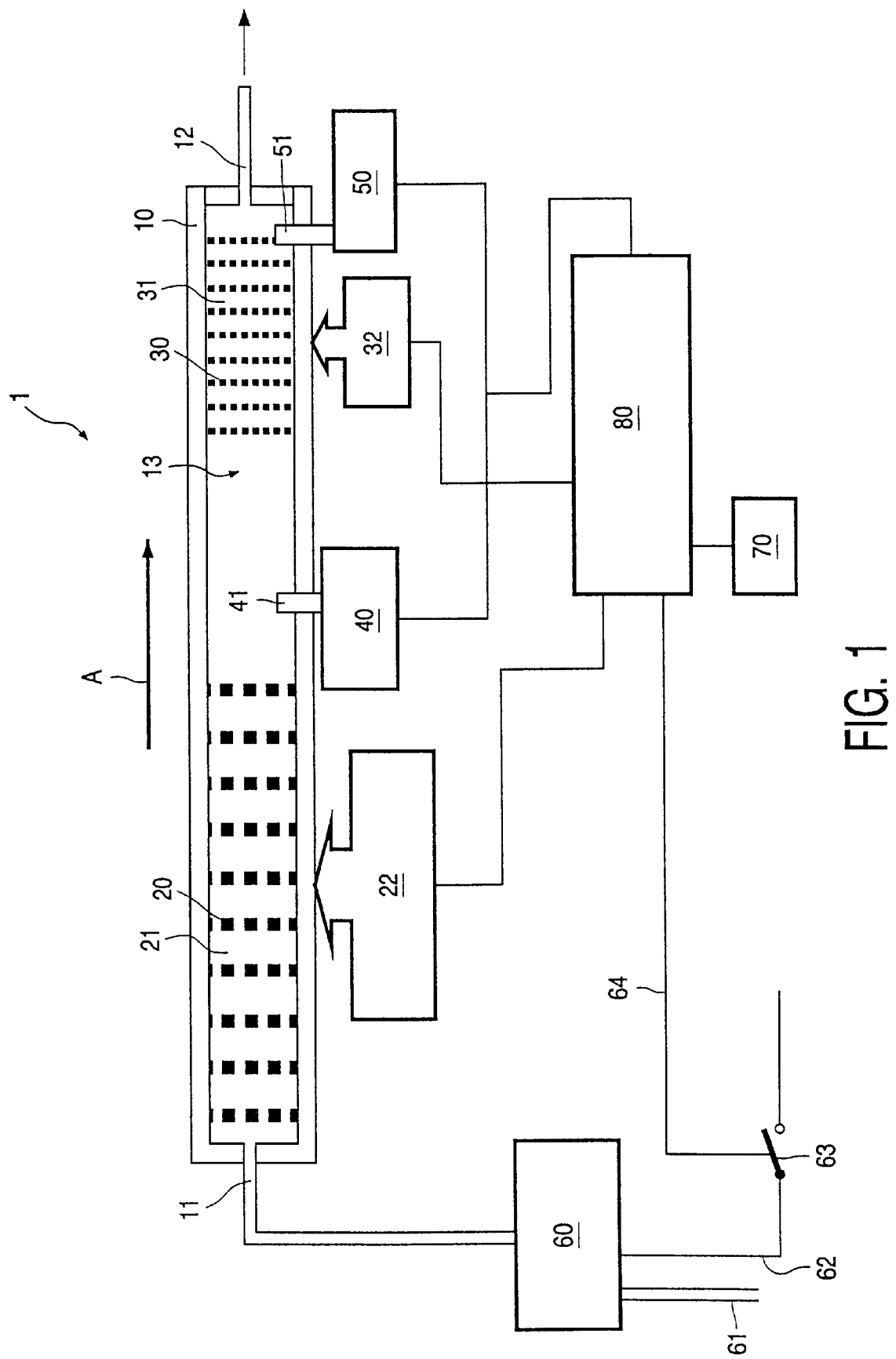

The invention relates to a water flow heater as defined in the preamble of claim 1.

Such a water flow heater is known from the German patent application DE 2 837 934. This water flow heater is designed for heating water which flows through the heating range of the water flow heater. A first heater element has a higher power than a second heater element and is situated upstream of said second heater element. Downstream of the second heater element there is a third heater element. The second heater element in its turn has a greater power than the third heater element. Temperature sensors are placed downstream of the second heater element and of the third heater element for scanning the temperature of the water heated by the heater elements.

The first heater element is switched on in response to the flow through the channel of a certain minimum quantity of water and is not controlled. The second heater element is controlled with a frequency of 10 min$^{-1}$ in dependence on the water temperature sensed by the temperature sensor directly downstream of said second heater element in the channel. The third heater element is controlled with a frequency of 100 min$^{-1}$ in dependence on the water temperature sensed by the temperature sensor directly downstream of said third heater element in the channel.

Since the heater elements are controlled with a lower frequency in proportion as the power is greater, and since the heater element with the highest power is controlled independently of temperature, a limitation of the interference with the public mains is achieved. Such interferences are unpleasant in particular because they lead to variations in the light output of lamps, which fluctuations are visible to the human eye at very small voltage fluctuations already and are perceived as unpleasant.

The German patent application 34 26 046 and European patent 0 630 463 also disclose water flow heaters for heating water with several heating zones in succession, in which exclusively a portion of the heating zones is controlled in dependence on the temperature of water supplied by the water flow heater, while the other portion of the heating zones is activated exclusively in reaction to the detection of a certain minimum flow of water.

It is a disadvantage of this known water flow heater that the water temperature often does not come up to a user's expectations in the case of a low flowrate and becomes badly predictable. The water temperature becomes either too high, because too much power is supplied for the water flowrate, or too low, because the water flowrate lies below the lower limit below which the first heating zone is switched off. This problem becomes stronger in proportion as the first heating zone has a comparatively greater power, and the relative control range of the water flow heater is smaller. A high power of the non-controlled heating zone in proportion to the total power is advantageous, however, because in that case only a comparatively small power is to be controlled. It is suggested in the German patent application 34 26 046 to switch certain heating zones on and off in dependence on the water flowrate, but this complicates the construction and increases the number of switching operations, as does the temperature-dependent control, with the result that voltage fluctuations occur in the public mains.

The invention has for its object to provide a simple solution which renders it possible to implement such a control at low cost in, for example, small domestic appliances such as coffee-makers. According to the invention, this object is achieved in that a water flow heater is constructed in accordance with claim 1.

The use of a pump for generating the water flow through the channel and the activation of the heater elements in conjunction with the activation of the pump achieve in a simple manner that, if there is a water flow through the channel, the water flowrate will at least have a certain value and will always lie within a predetermined, comparatively narrow bandwidth, at least after a starting phase. This renders it possible to use a comparatively large, non-controlled heater element without the undesirable consequences of an occasionally unexpectedly high or low water temperature arising.

The necessity of complicated and vulnerable detectors for determining the water flowrate and of separate heater elements which are controlled in dependence on the water flowrate is thus also avoided.

Particularly advantageous embodiments of the invention are described in the dependent claims.

Further aspects, effects, advantages and details of the invention will be explained below with reference to an embodiment of the invention, in which reference is made to the drawing.

Figure 2:
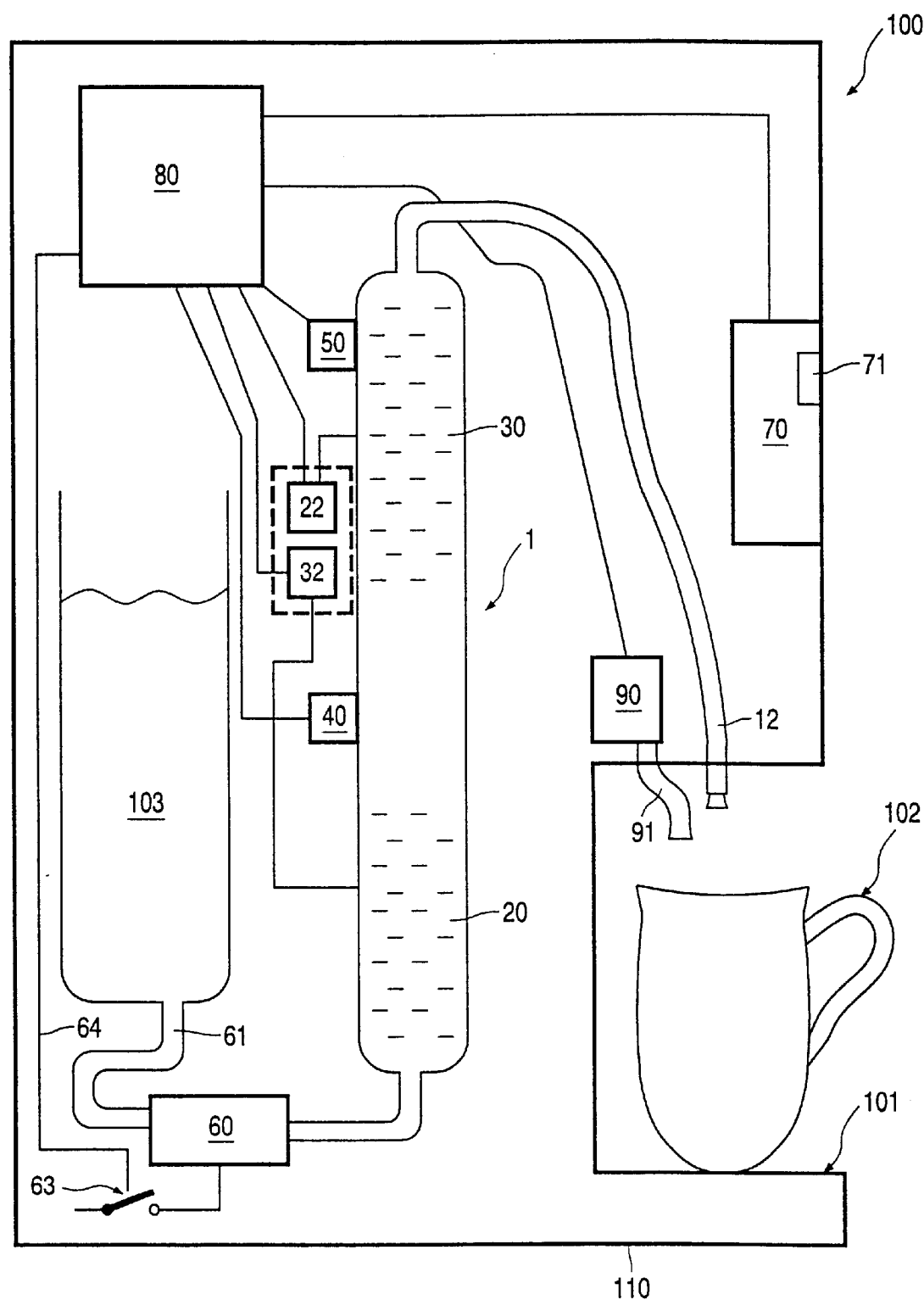

FIG. 1 therein diagrammatically shows a water flow heater according to the invention, and FIG. 2 diagrammatically shows a coffee-maker according to the invention.

The water flow heater in the example shown in the drawing has a tube 10 with an inlet 11 and an outlet 12, through which tube 10 a channel 13 extends. The inlet 11 is connected to a pump 60 which is capable of pumping water, received by the pump 60 through a water supply 61, to the tube 10. The pump is preferably designed for pumping water with a predetermined, fixed flowrate which during operation preferably deviates by no more than 20%, and preferably by less than 5 to 10%, from a predetermined nominal value. Controlling the pump 60 with a fixed flowrate during a certain time renders it possible to pump a certain volume of liquid. Water pumped by the pump 60 to the tube 10 then flows through the tube 10 in a direction indicated with an arrow A and leaves the tube 10 through the outlet 12. The water flow heater is provided with a first heater element 20, which surrounds a first heating section 21 of the tube 10, for heating the water in the tube 10, said section being designed for heating the water flowing through the tube 10 in a first heating step. The first heater element 20 is preferably constructed as a film-type electrical resistor. The first heater element 20 is part of a circuit with an electrical supply 22. The first heater element 20 and the supply 22 are constructed such that the first heater element 20 can operate exclusively with a substantially fixed heat output. That is not to say that the power dissipated by the first heater element 20 may not be slightly dependent on the average operating temperature thereof. It is not controllable, however.

Downstream of the first heating section 21 there is a first temperature sensor 40 which is capable of measuring the temperature of water flowing through the tube 10 in a measuring position 41. A second heater element 30 designed for heating water flowing through the tube 10 in a second heating section 31 is situated downstream of the first heating section 21 and of the temperature sensor 40. The element 30 is supplied by an electrical supply 32. The electrical supply 32 is coupled to a control unit 80 and together therewith forms a control for the second heater element 30, which is designed for adapting the heat output of the heater element between a minimum standby power up to full power in up to 32 steps. Each control step here preferably represents a temperature increase or decrease of the water issuing from the tube 10 of approximately 2° C. The second heater element 30 is also preferably constructed as a film-type electrical resistor. Downstream of the second heater element 30, close to the outlet 12, there is a temperature sensor 50 which assumes the temperature of water flowing through the tube 10 at the area of a second measuring position 51 downstream of the second heater element 30 and which supplies a signal representing the temperature of the second temperature sensor 50.

The control unit 80 is connected to the first temperature sensor 40, to the second temperature sensor 50, to the supply 22 of the first heater element 20, to the supply 32 of the second heater element 30 and, via a connection 64, to a switching member 63 for switching a control connection 62 for the pump 60. The control unit 80 is also provided with a control panel 70 for a user, which control panel may comprise, for example, an on/off switch.

During operation, the control unit 30 activates the operational switch 63, and thus the pump 60, in response to a signal from the control panel, for example from the on/off switch.

Water supplied through the line 61 is pumped by the pump 60 via the inlet 111 through the tube 10. The water supplied may be, for example, tap water from a reservoir of a coffee-maker which will usually have a temperature of 10 to 30° C., depending on ambient conditions. The control unit also activates the supplies 22, 32 of the heater elements 20, 30, which are both supplied at full power. Water flowing through the tube is heated thereby until the temperature of the heated water reaching the temperature sensor 51 has reached a predetermined maximum value, for example in a range from 75 to 100° C. When this is the case, the electric power with which the second supply 32 supplies the second heater element 30 is reduced in steps. In the present example, the power of the supply 32 of the second heater element 30 can be controlled in 32 steps. The resolution is preferably 2° C. A control range of 64° C. is thus realized in 32 steps. Preferably, the control unit 80 is designed for first switching on one or both heater elements, for preheating, upon receiving a switch-on signal from the control panel 70. After the desired preheating period, the pump 60 is then activated. A better heat control can be obtained with preheated heater elements.

The control unit 80 then also registers a temperature signal originating from the first temperature sensor 40. If this temperature rises or drops suddenly, the control unit 80 will react thereto by reducing or increasing the power supplied to the second heater element 30.

The pump 60 ensures that the water flowrate through the tube 10 will lie within a comparatively small bandwidth. As a result, the first heater element may have a comparatively high power, and only a comparatively small power of the second heater element need be controlled. This power may thus be controlled in a comparatively simple manner in steps, and if necessary with a high control frequency, without this leading to undesirable interferences in the mains, since very small interferences therein already lead to fluctuations in light output which are experienced as unpleasant by the human eye. To keep the power to be controlled limited, the fixed power of the first heater element 20 preferably amounts to at least two thirds up to three quarters of the total maximum power of the two heater elements 20, 30.

Since the temperature of the heated water is measured prior to the second heating step, and the second heating step is controlled also on the basis of this measuring result, a quick-reaction control of the final temperature of the water is obtained. This is especially important for compensating variations in the heat output of the first heater element caused by, for example, fluctuations in the supply voltage, and for quickly achieving the correct adjustment of the power of the second heater element after switching-on. The feedback in response to the temperature measured after the second heating step then ensures an accurate control of the final temperature also in the longer term.

Compared with a sensing of the temperature of the water upstream of the first heating section 21, this provides the advantage that differences in heat output of the first heater element 20 are also registered and can also be compensated through control of the power of the second heater element 30.

Since the heating section 31 in which the controllable heater element 30 is active is situated at least partly downstream of the first heating section 21 of the channel, in which a fixed power is supplied, the control of the second heater element 30 can react quickly to changes in the effectivity of the first heater element 20. It is alternatively possible, however, to place the heating section of the channel in which the controllable heater element is active upstream of the heating section in which the heater element of fixed power is situated, or to have these sections coincide wholly or partly.

The control proposed here is especially advantageous if water is to be heated to a temperature of 75 to 100° C., because in the case of a slow control the water may easily be heated locally up to boiling point, which will lead to a heavy thermal load on the heater element and to an accelerated scale deposit.

The second temperature sensor 50 is situated very close to the second heater element 30, so that the latter will heat up strongly if no water is supplied. The control unit switches off the current supply to both heater elements in reaction to the second temperature sensor 50 reaching a second higher temperature, until a switch-on signal is received again through the connection 64. A protection of the water flow heater against overheating is obtained thereby, providing an automatic switch-off when the quantity of water to be heated and contained in a feed reservoir has been passed through the water flow heater.

FIG. 2 shows a device for the preparation of drinks according to the invention, depicted in the form of a coffee-maker 100. The coffee-maker 100 has a housing 110 which is provided with a support 101 for holding a mug or cup 102. The housing 110 further accommodates a water reservoir 103 filled with water and provided with an outlet 61. A heating device 1 is accommodated in the housing, corresponding to the heating device described above. The heating device 1 is provided with a control system as in the first embodiment. The control unit 80 is connected to the first temperature sensor 40, to the second temperature sensor 50, to the supply 22 of the first heater element 20, to the supply 32 of the second heater element 30, and, via a connection 64, to a switching member 63 for switching the pump 60. The supplies 22 and 32 may be placed, for example, together in a single unit. The pump 60 is in communication with the outlet 61, so that the pump can pump water from the reservoir. The control unit 80 is also provided with a control panel for a user, comprising an on/off switch 71. The outlet 12 of the heating device 1 is situated such that it issues above a cup 102 present on the support 101. Next to the outlet 12, there is an outlet 91 of a coffee dispensing device 90 such that also the outlet 91 issues above a cup 102 present on the support 101. This coffee dispensing device 90 is connected to the control unit 80 and is designed for dispensing a certain quantity of coffee extract. Such dispensing devices are known per se from daily practice.

During operation, a user places a cup 102 on the support 101 and presses the on/off switch 71. The control unit 80 then controls the heating device 1 and the pump 63 in the manner described above such that a predetermined quantity of hot water is supplied through the outlet 12 into the cup 102. The control unit also triggers the dispensing device 90 such that a given quantity of coffee extract is introduced into the cup 102. Mixing of the hot water and the coffee extract in the cup 102 yields coffee in the cup 102. The dispensing device 90 is not limited to the dispensing of coffee extract; the dispensing device 90 may be constructed for supplying alternative extracts for the preparation of drinks such as, for example, tea, hot chocolate, and soup.

It will be clear to those skilled in the art that the coffee-maker may be both of the filter system type, in which the heated water drips onto a bed of coffee in a filter, and of the pressure chamber system (espresso), in which the water is forced under pressure through the coffee in a closed chamber before it flows into the cup 102.

It will be clear from the above to those skilled in the art that many more modifications and embodiments are possible within the scope of the invention. It is furthermore also possible to use several fixed and/or controllable heater elements.

What is claimed is:

1. A water flow heater for heating water, comprising:
   a channel (13),
   a first electric heater element (20) for heating water in a first heating section (21) of the channel (13),
   a second electric heater element (30) for heating water in a second heating section (31) of the channel (13), and
   means (40, 50) for measuring the temperature of water in the channel (13) in at least one measuring position (41, 51) downstream of at least one of said heating sections of the channel (13),
   a signal generator (64) for generating a water flow signal in accordance with a flow of water through the channel (13), and
   a control (22, 32, 80) coupled to said means (40, 50) and to at least the second heater element (30) for controlling the heat output from the second heater element (30) in accordance with a temperature sensed by said means (40, 50),
   wherein said heater elements (20, 30) are connected to said signal generator (64) for activating said heater elements (20, 30) in response to a water flow signal, and
   wherein the first heater element (20) is connected for supplying a fixed, substantially constant power,
   characterized by a pump (60) for generating a water flow through said channel (13) and a control member (63) for activating the pump (60), while the signal generator is constructed as a connection (64) to said control member (63) for generating a water flow signal in conjunction with an active triggering of the pump (60).

2. A water flow heater as claimed in claim 1, wherein said means comprise at least a temperature sensor (40) whose measuring position (41) is situated downstream of at least a portion of said first heating section (21) and upstream of at least a portion of said second heating section (31).

3. A water flow heater as claimed in claim 2, wherein said means comprise a second temperature sensor (50) which is positioned for measuring the temperature of water in the channel (13) in a measuring position (51) downstream of said second heating section (31) of the channel (13).

4. A water flow heater as claimed in claim 1, wherein the control (22, 32, 80) is designed for controlling the heat output from the second heater element (30) in steps.

5. A water flow heater as claimed in claim 1, wherein the control (22, 32, 80) is designed for controlling the heat output from the second heater element (30) such that water is heated to a temperature of 75 to 100° C.

6. A water flow heater as claimed in claim 1, wherein the heater elements (20, 30) have a total maximum power, and wherein the first heater element (20) has a power accounting for at least two thirds, and preferably three quarters of the total maximum power of the heater elements (20, 30) together.

7. A water flow heater as claimed in claim 1, wherein the control is designed for switching on first at least one heater element in response to a switch-on signal from a user, and for switching on the pump (60) after a certain heating-up period of the at least one heater element.

8. A device for preparing hot drinks in individual servings, provided with a water flow heater as claimed in claim 1.

9. A device as claimed in claim 8 wherein the device is a coffee-maker (100).

* * * * *